United States Patent [19]
// Risch et al.

Patent Number: 6,066,397
Date of Patent: *May 23, 2000

[54] POLYPROPYLENE FILLER RODS FOR OPTICAL FIBER COMMUNICATIONS CABLES

[75] Inventors: Brian G. Risch; James D. Holder, both of Hickory, N.C.

[73] Assignee: Alcatel, Paris, France

[ * ] Notice: This patent is subject to a terminal disclaimer.

[21] Appl. No.: 09/052,220

[22] Filed: Mar. 31, 1998

[51] Int. Cl.[7] .............................. G02B 6/00; H04B 10/12
[52] U.S. Cl. ......................... 428/379; 428/375; 428/378; 428/392; 385/100; 385/103; 385/113; 385/123
[58] Field of Search ...................................... 428/375, 378, 428/392, 383, 379; 385/100, 109, 113, 124, 141, 123, 103

[56] References Cited

U.S. PATENT DOCUMENTS

| | | |
|---|---|---|
| 4,550,976 | 11/1985 | Cooper et al. |
| 5,574,816 | 11/1996 | Yang et al. ............................. 385/100 |
| 5,615,293 | 3/1997 | Sayegh ..................................... 385/100 |
| 5,675,686 | 10/1997 | Rosenmayer et al. ................... 385/114 |
| 5,911,023 | 6/1999 | Risch et al. .............................. 385/100 |

Primary Examiner—William Kynski
Assistant Examiner—J. M. Gray
Attorney, Agent, or Firm—Ware, Fressola, Van Der Sluys & Adolphson LLP

[57] ABSTRACT

A filler rod for occupying space in a stranded optical fiber communications cable having at least one buffer tube containing at least one optical fiber is disclosed. The filler rod comprises an elongated rod extruded from a polypropylene homopolymer, a polypropylene-polyethylene copolymer (i-PP) resin material, or preferably, from a polypropylene-polyethylene copolymer having a nucleating agent disbursed therein. The resin material is foamed during extrusion so as to have a plurality of void spaces therein and a relative density which is less than 1 relative to the unfoamed resin material. As compared to rods made from high density polyethylene, the i-PP filler rods show a greater foaming efficiency, more efficient use of material, an improved combination of mechanical properties and density, reduced post-extrusion shrinkage and a substantial reduction in the sticking of the filler rods to the outer jacket that is experienced with high density polyethylene filler rods.

13 Claims, 3 Drawing Sheets

POLYPROPYLENE FILLER RODS FOR OPTICAL FIBER COMMUNICATIONS CABLES

BACKGROUND OF THE INVENTION

1. Field of the Invention

The present invention relates to communications cables. More particularly, the present invention relates to filler rods for stranded optical fiber cables made from polypropylene based materials.

2. Description of the Prior Art

Optical fiber cables have been in use in the communications industry for a number of years to transmit information at very high rates over long distances. Optical fiber cables come in a variety of configurations. The configurations include: cables with a centrally located single buffer tube containing one or more optical fibers; cables with a plurality of buffer tubes stranded in a helical or alternating helical arrangement about a central strength member; and cables with slotted cores in which a plurality of optical fibers reside.

In stranded optical fiber cables, each of the buffer tubes typically contains up to 12 optical fibers or more, or in some cases ribbons. The buffer tubes are usually stranded in an alternating helical or S-Z configuration. For example, a 72 count stranded optical fiber cable has a core containing six buffer tubes arranged about a central strength member and each of the six buffer tubes contains 12 optical fibers. A protective jacket is usually extruded over the core. Other strength members such as aramid yarns, ripcords and water blocking members can be included in the cable.

In some cases, it is desirable to have a lower fiber count in a standard configuration cable having the same symmetrical concentricity. For example, it may be desirable to have a 36 count stranded optical fiber cable which is substantially the same in terms of concentric structure to a 72 count cable except for the reduced number of fibers. When a reduced count cable is made, normally one or more of the buffer tubes are replaced by filler rods. The filler rods fill the space that would normally be occupied by a buffer tube containing optical fibers so as to keep the structure of the cable intact. For example, cables having 12, 18, 24, or 36 fiber counts can use the same basic cable structure and therefore have the same overall diameter despite different fiber counts. The filler rods also permit the manufacturing lines for making such optical fiber cables to remain substantially unchanged, whether making a low or high count optical fiber cable.

Prior to the present invention described below, filler rods were typically made with solid or with foamed high density polyethylene (HDPE). When foamed HDPE was used, it was foamed to approximately 90% of the unfoamed HDPE density. Foamed HDPE was an attractive filler rod material mainly due to low cost. However, some problems experienced with filler rods made from such material in some environments in which cables containing such rods includes excessive post extrusion shrinkage and reduced crush resistance, especially in low count cables with many filler rods. Also, processing cables with reduced thermal barriers between the jacket and core have created a demand for filler rods made with a material which has better dimensional stability at higher temperatures. In some cases, outer jackets of cables are made with materials having a higher melting point than the HDPE material. When such materials are extruded over the HDPE filler rods, some of the HDPE melts causing it to become intermingled with the molten outer jacket material. When this happens, the filler rods can stick to the outer jacket, a phenomenon which is undesirable because it decreases the ease of cable and fiber accessibility.

It is generally understood by those skilled in the art that reliability of cable components, such as filler rods, over a long time period and under extreme environmental conditions is very important. For example, it is desirable that filler rods for optical fiber cables undergo a minimum amount of shrinkage during the cable's lifetime. It is also desirable to provide filler rods designed to have physical properties which are compatible with the physical properties of the material currently used for the buffer tubes in such cables, such as that found in U.S. Pat. No. 5,574,816, so that both the buffer tubes and filler rods respond in a similar manner to changing environmental conditions.

SUMMARY OF THE INVENTION

It is an object of the present invention to provide filler rods for stranded optical fiber cables to maintain the concentric symmetry of such cables when less than a maximum fiber count is desired.

These objects are accomplished, at least in part, by a filler rod for occupying space in a stranded optical fiber communications cable having at least one buffer tube containing at least one optical fiber. The filler rod comprises an elongated rod extruded from a polypropylene homopolymer or a polypropylene-polyethylene copolymer resin material. The resin material is foamed during extrusion so as to have a plurality of void spaces therein and a relative density which is less than 1 relative to the unfoamed resin material.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include.

DETAILED DESCRIPTION OF THE PRESENT INVENTION

Figure 1:
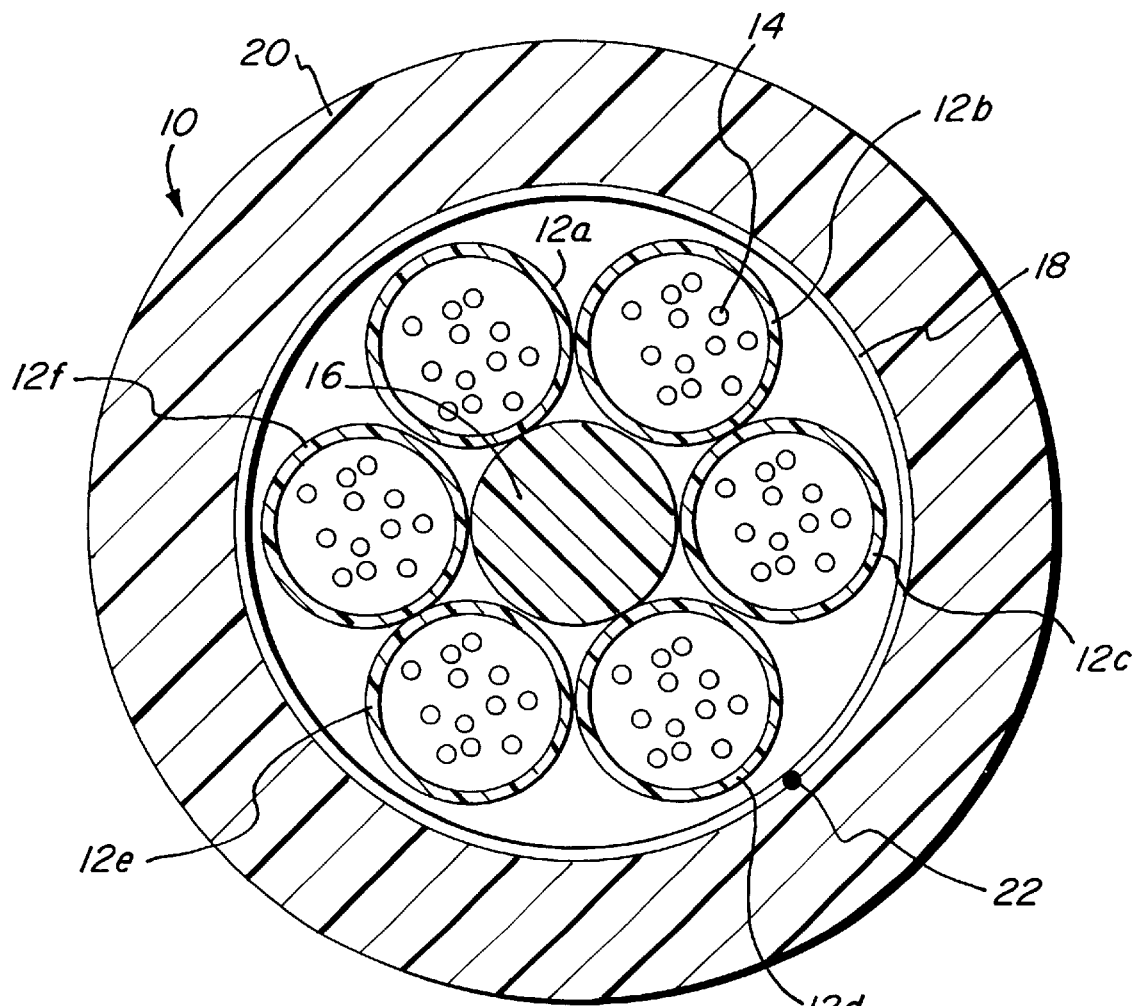
FIG. 1, which is a cross-sectional schematic diagram illustrating a stranded optical fiber cable having a plurality of buffer tubes.

FIG. 1 illustrates a typical stranded optical fiber cable. The cable 10 has a core comprised of a plurality of buffer tubes 12a–12f, each of which house optical fibers 14, stranded about a central strength member 16. A core wrap 18 may positioned over the core. Water blocking materials (not shown) may be disposed in the core, if desired. A protective outer jacket 20 is disposed over the core and a ripcord 22 is provided near the interface of the wrap 18 and the outer jacket 20. The cable 10 illustrated in FIG. 1 has a maximum fiber count of 72 fibers.

Figure 2:
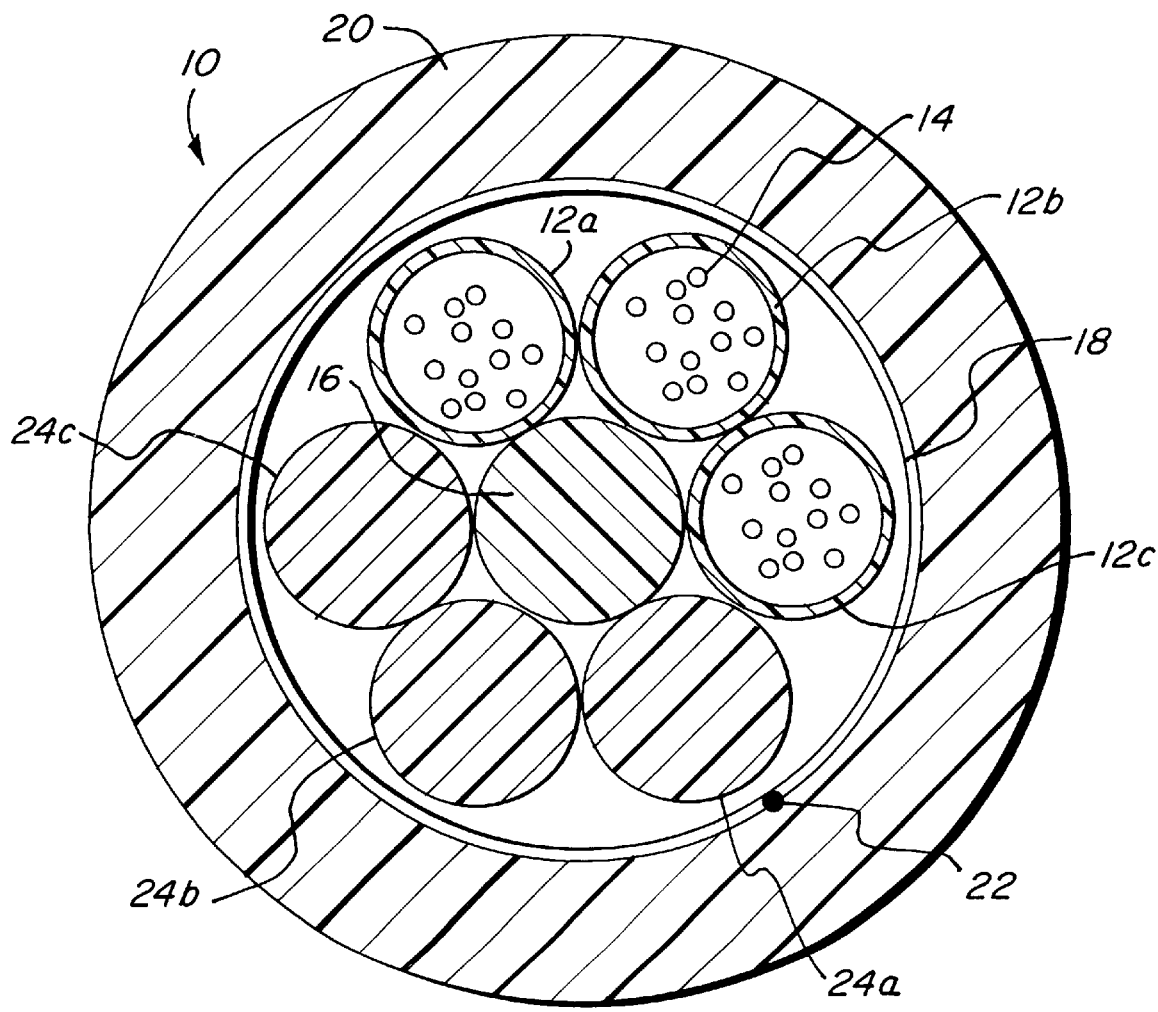
FIG. 2, which is a cross-sectional schematic diagram a stranded optical fiber cable similar in structure to the cable illustrated in FIG. 1 wherein some of the buffer tubes have been replaced by filler rods.

Referring to FIG. 2, when a cable having a fiber count lower than 72 fibers, for example, is desired, such as 36, some of the buffer tubes (12d–12f) are replaced by filler rods 24a–24c. These filler rods help to maintain the overall concentric structure and material properties of the lower count stranded optical fiber cable to be the same as the higher count fiber cable.

According to the present invention, it has been found that filler rods (24a–24c) extruded from a foamed polypropylene homopolymer or preferably from an impact modified polypropylene-polyethylene copolymer (i-PP) resin material have superior mechanical and physical properties which make them suitable and superior to prior art filler rods extruded from foamed high density polyethylene (HDPE) resin. Under typical high speed outer jacket extrusion rates on the order of 600 to 1200 meters per minute, the filler rods made from the above polypropylene materials did not stick to the outer jacket, unlike the filler rods made from the HDPE material.

Preferably, a nucleating agent is dispersed in the copolymer resin prior to the extrusion of filler rods. Nucleating agents that can be used in the i-PP resin material include: inorganic materials, such as talc, mica, silica, carbon black and kaolin; salts of aliphatic monobasic or dibasic acids or arylalkyl acids, such as sodium succinate, sodium glutarate, sodium caproate, sodium 4-methylvalerate, aluminum phenylacetate and sodium cinnamate; or alkali metal or aluminum salts of aromatic or alicyclic carboxylic acids, such as aluminum benzoate, sodium or potassium benzoate, sodium β-naphthoate, lithium benzoate, and aluminum term.-butylbenzoate. The nucleating agents form nuclei for growth of crystals in the polypropylene-polyethylene copolymer melt. A high degree of crystallinity and a more uniform crystalline structure is obtained by adding the nucleating agent to the copolymer melt which is extruded to make the filler rods. The nucleating agent increases the Young's modulus, yield, tensile strength, compression resistance and dimensional stability of the copolymer as well as reduce the coefficient of thermal expansion. Any nucleating agent added to the polypropylene-polyethylene melt to improve the above mentioned physical properties should be homogeneously dispersed in the polymer melt in a fine form (approximately 1 to 10 $\mu$m in size). It has been found that concentrations of up 0.08 weight percent to 0.5 weight percent provide the maximum enhancements of the copolymer's physical properties. It has also been found that higher concentrations of nucleating agents do not produce further enhancements of the copolymer's physical properties, and likewise, a filler rod made therefrom.

Figure 3:
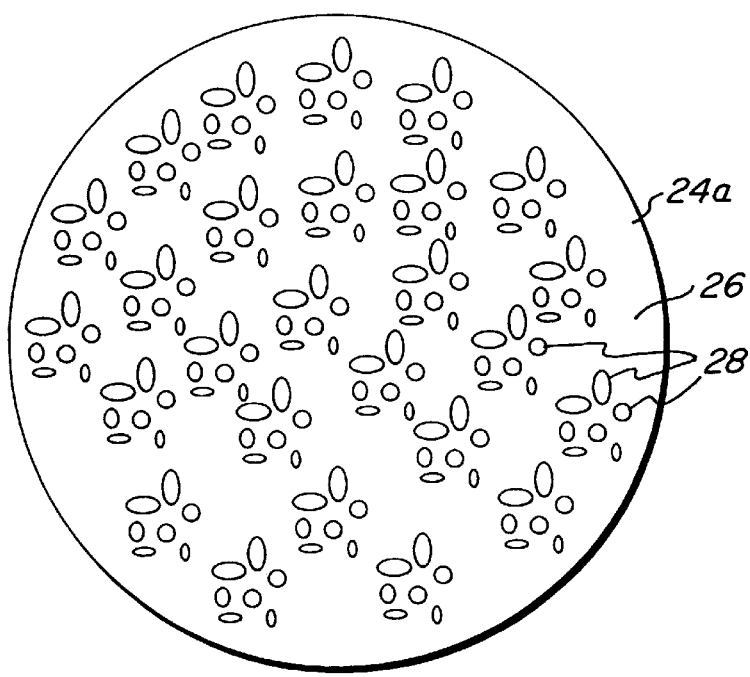
FIG. 3, which is a cross-sectional schematic diagram of a filler rod illustrating voids in the rod.

According to the present invention, foamed HDPE and i-PP materials were extruded, using ordinary extrusion processing, at a line speed of 600 m/min to form filler rods. Both the HDPE and i-PP material were foamed to approximately 90% of the bulk density of the starting material pellets by the addition of an azodicarbonamide chemical foaming agent to the copolymer melt prior to extrusion. Besides azodicarbonamide, the i-PP material may be foamed with a semicarbazide, a hydrazide or by pressurized gas such as carbon dioxide or nitrogen. FIG. 3 illustrates that the filler rods, such as 24a, have a plurality of voids 28 created by the foaming agent in the i-PP material 26. Filler rods were also extruded from the i-PP material having enough foaming agent added thereto to foam the extruded material to 70% of the bulk density of the starting material pellets. The filler rods foamed to 70% were extruded at a line speed of 1200 m/min. The i-PP material contained approximately 0.08% sodium benzoate as the nucleating agent. The melt flow index (MFI) of the HDPE material was determined to be approximately 0.78 g/10 min. according to ASTM 1238-86E and the melt flow index of the i-PP was determined to be approximately 3.76 g/10 min according to ASTM D1238-57T. Because the above referenced ASTM standards require different measurement temperatures, 190 and 230° C., for the HDPE and the i-PP materials, respectively, the MFI for HDPE at 230° C. was also measured and determined to be about 1.39 g/10 min. Under both measurement techniques, the MFI for the HDPE material was determined to be substantially less than that for the i-PP material. Table 1 summarizes the characteristics of the foamed filler rods made as described above.

TABLE 1

| Material | Quantity of Foaming Agent Added (kg/km) | Starting Density (g/cc) | Final Density (g/cc) | Relative Density | MFI (g/10 min) |
| --- | --- | --- | --- | --- | --- |
| HDPE | 0.118 | 0.946 | 0.851 | 0.900 | 0.78 |
| i-PP | 0.059 | 0.905 | 0.804 | 0.888 | 3.76 |
| i-PP | 0.150 | 0.905 | 0.649 | 0.717 | 3.76 |

The above described filler rods were tested for tensile loading at yield and elongation using an Instron Model 4468 mechanical tester. A gauge length of 3.5 inches (8.9 cm) was used with a crosshead speed of about 1.4 inches per minute (3.6 cm/min). For all samples of the higher MFI i-PP material, the mechanical tester reached its extension limits before the sample broke. Table 2 is a compilation of the test results. Typical load at yield for 3 mm diameter 10% foamed i-PP material was observed to be about 34 pounds, which is approximately 100 percent greater than the maximum possible tensions experienced during the cable stranding process. Typical load at yield for 3 mm diameter 30% foamed i-PP material was observed to be about 22.5 pounds (10.2 kg), which was close to the 25 pounds (11.3 kg) exhibited by the 10% foamed HDPE filler rods. The data compiled in Tables 1 and 2 demonstrate that the i-PP material with the higher melt flow index provides a more effective use of the base polymer and foaming agent and results in improvements in mechanical properties. The 22.5 pound (10.2 kg) tensile load of the 30% foamed i-PP filler rods exceeds the maximum observed stranding tension for a Frisch strander with a 1000 g dancer weight, with 3.7 turns and with the line stopped, by about 40%.

TABLE 2

| Material | Foamed Density (g/cc) | Crush Resistance (kg) | Elongation to Break (%) | Tensile Load at Yield (kg) |
| --- | --- | --- | --- | --- |
| HDPE | 0.851 | 272 | 300 | 11.3 |
| i-PP | 0.804 | 317 | >530 | 15.4 |
| i-PP | 0.649 | 135 | >530 | 10.2 |

A significant change in crush resistance is also evident when the amount of foaming is increased from about 10% to about 30%. Typical crush resistance values (load at yield) for i-PP buffer tubes is from about 100 lbs (45.4 kg) to 150 lbs (68.0 kg). As set forth on Table 2, a 30% foamed filler rod has a crush resistance of approximately 298 lbs (135 kg), which is nearly twice the value of the buffer tubes. It is generally desirable for filler rods to have a crush resistance which closely matches the crush resistance of the buffer tubes. Polypropylene filler rods appeared to have a more balanced set of properties which approximate the tensile and crush resistance characteristics of buffer tubes made from i-PP materials.

Figure 4:
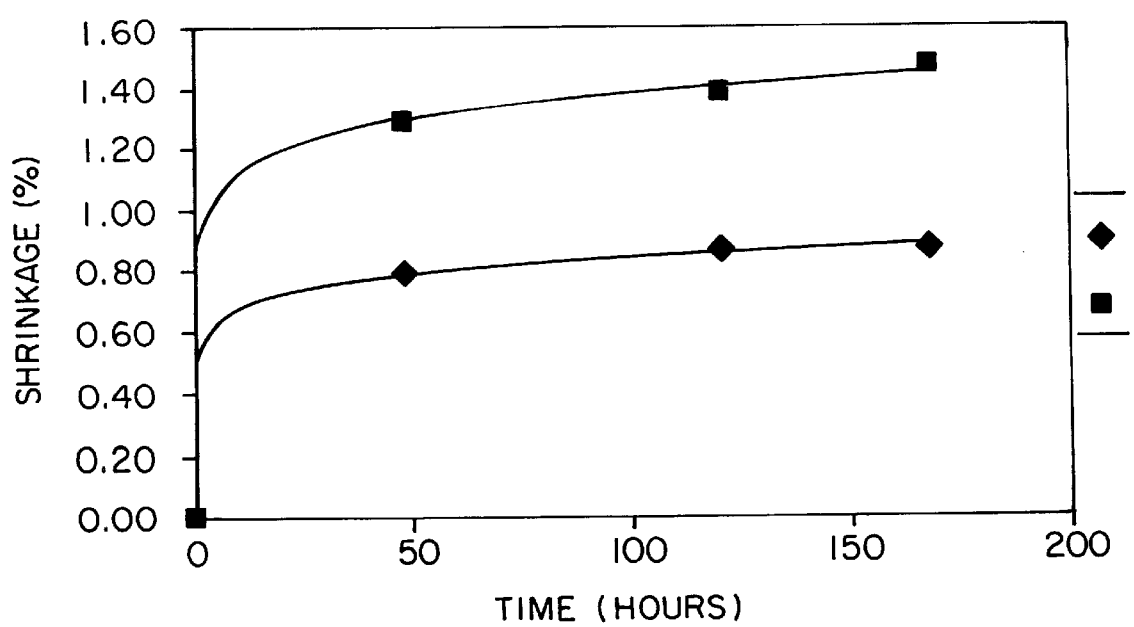
FIG. 4, which is a graphical comparison of the shrinkage of 10% foamed filler rods at 85° C. versus time.

As one skilled in the art will appreciate, it is desirable that cable components such as filler rods, experience a minimum amount of shrinking during the lifetime of the cable. To determine shrinkage, a heat aging test at 85° C. for one week as set forth in Bellcore GR-20 was conducted. FIG. 4 illustrates the post extrusion shrinkage of 18 inch (45.7 cm) filler rod specimens after the heat aging test for materials foamed to 10%. From FIG. 4, it is evident that the i-PP material had significantly lower shrinkage than the HDPE material. It is suspected that the lower shrinkage of the i-PP material is the result of lower processed induced molecular orientation. Where a high degree of molecular orientation is imparted to a polymer melt, such as in the case of high speed extrusion of foamed filler rods, lower molecular weight materials (i.e., those materials with a higher MFI) are more desirable due to their ability to achieve more rapid molecular relaxation which results in less orientation in the final product. Besides providing lower post extrusion shrinkage, the reduced molecular orientation in the extrusion or machine directions results in strength in the transverse direction.

The reliability of the i-PP and HDPE materials forming the filler rods was studied in terms of Oxidation Induction Time (OIT) and longer term oxidative stability during accelerated testing in ovens. For long term reliability, the i-PP material forming the filler rods included 0.13 weight percent phosphite synergist, 0.30 weight percent hindered phenolic and 0.15 weight percent hindered amine. OIT values were measured according to the methods set forth in ASTM 3895-95. Aluminum pans instead of copper pans were used since copper has been shown to catalyze some degradation reactions in polyolefins resulting in reduced OIT values as well as induce variability of the test results depending on the state of oxidation of the pan's surface. A TA 912 DSC was used for the OIT determination. A summary of OIT values for before and after extrusion processing of the i-PP and HDPE materials is provided in Table 3. The data in Table 3 suggest that the i-PP material undergoes a process induced change which is comparable to HDPE material, both of which are highly suitable for filler rod applications. The hindered amines are generally considered to be less effective at high temperature and melt stabilization than the hindered phenolic-phosphite combination. However, the hindered amine class of antioxidants is very effective for long term thermooxidative stabilization due to the fact that, unlike hindered phenolics, the free radical scavengers can regenerate. Stabilizing materials such as BHT may also be used.

TABLE 3

| Material | OIT Before Extrusion (Min) | OIT After Extrusion (Min) | Change in OIT (Min) |
| --- | --- | --- | --- |
| i-PP | 120 | 98 | 22 |
| HDPE | 142 | 118 | 24 |

In a 1 year outdoor exposure study of the i-PP material and HDPE material, the HDPE material showed embrittlement while the i-PP material still retained substantial mechanical integrity. The exposure conditions for this test were more severe than in cable applications since the materials were also exposed to UV radiation.

It can be seen from the foregoing disclosure and series of examples that the present invention offers substantial advantages over the prior art in terms of physical properties, cost and the substantial reduction of the sticking problem caused by the melting of HDPE filler rods when an outer jacket material having a higher melting temperature is extruded there over. The embodiments disclosed herein achieve the object of the invention; however, it should be appreciated by those skilled in the art that departures can be made from the following claims without parting from the spirit and scope of the invention.

What is claimed is:

1. A stranded optical fiber communications cable comprising:
   at least one elongated buffer tube;
   at least one optical fiber disposed in the buffer tube;
   at least one elongated filler rod extruded from a polypropylene-polyethylene copolymer resin material, the resin material being foamed during extrusion so as to have a plurality of void spaces therein and a relative density which is less than 1; and
   a jacket circumscribing the buffer tube, the optical fiber disposed in the buffer tube and the extruded elongated filler rod.

2. The cable of claim 1, wherein the resin material has a melt flow index greater than about 3.

3. The cable of claim 2, wherein the extruded foamed resin material forming the elongated filler rod has a relative density in the range of about 0.7 to 0.9 relative to the unfoamed resin material.

4. The cable of claim 3, wherein the foamed resin material forming the elongated filler rod is foamed with a chemical foaming agent selected from the group consisting of azodicarbonamides, semicarbazides and hydrazides.

5. The cable of claim 3, wherein the foamed resin material forming the elongated filler rod is foamed with pressurized gas.

6. The cable of claim 3, wherein the resin material contains a nucleating agent.

7. The cable of claim 6, wherein the nucleating agent is selected from the group consisting of talc, mica, silica, carbon black, and kaolin.

8. The cable of claim 6, wherein the nucleating agent is selected from the group consisting of sodium succinate, sodium glutarate, sodium caproate, sodium 4-methylvalerate, aluminum phenylacetate and sodium cinnamate.

9. The cable of claim 6, wherein the nucleating agent is selected from the group consisting of aluminum benzoate, sodium benzoate, potassium benzoate, lithium benzoate, sodium β-naphthoate, and aluminum tert.-butylbenzoate.

10. The cable of claim 6, wherein the nucleating agent comprises approximately 0.08 to 0.05 weight percent of the resin.

11. The cable of claim 6, wherein the resin material contains approximately 0.08 weight percent sodium benzoate as the nucleating agent.

12. The cable of claim 11, wherein the resin material contains a thermooxidation stabilizing material selected from the group consisting of hindered amines, hindered phenolics and phosphite synergists.

13. The cable of claim 12, wherein the outer jacket is made from polyethylene.

* * * * *

UNITED STATES PATENT AND TRADEMARK OFFICE
CERTIFICATE OF CORRECTION

PATENT NO. : 6,066,397
DATED : May 23, 2000
INVENTOR(S) : Brian G. Risch and James D. Holder It is certified that error appears in the above-identified patent and that said Letters Patent is hereby corrected as shown below:

In column 6, line 51 (claim 10, line 2), "0.05" should be --.50--.

Signed and Sealed this

Twenty-fourth Day of April, 2001

Attest:

NICHOLAS P. GODICI

Attesting Officer      Acting Director of the United States Patent and Trademark Office